US005481874A

United States Patent [19]

Budzich

[11] Patent Number: 5,481,874

[45] Date of Patent: Jan. 9, 1996

[54] EXHAUST PRESSURIZING CIRCUIT INCLUDING FLOW AMPLIFICATION

[75] Inventor: Tadeusz Budzich, Moreland Hills, Ohio

[73] Assignee: Caterpillar Inc., Peoria, Ill.

[21] Appl. No.: 966,179

[22] PCT Filed: Jun. 20, 1991

[86] PCT No.: PCT/US91/04387

§ 371 Date: Jun. 20, 1991

§ 102(e) Date: Jun. 20, 1991

[51] Int. Cl.[6] .......... F16D 31/02

[52] U.S. Cl. .......... 60/428; 91/6; 91/449; 91/459

[58] Field of Search .......... 91/1, 6, 449, 415, 91/400, 421, 437, 512, 459; 60/421, 422, 428, 460, 461, 466, 477

[56] References Cited

U.S. PATENT DOCUMENTS

| | | | |
|---|---|---|---|
| 3,700,396 | 10/1972 | Adams | 91/449 X |
| 4,022,269 | 5/1977 | Segawa | 91/6 X |
| 4,085,855 | 4/1978 | Worback | 214/138 |
| 4,249,570 | 2/1981 | Budzich | 60/428 X |
| 4,267,860 | 5/1981 | Budzich | 137/596.2 |
| 4,610,194 | 8/1988 | Budzich | 91/446 |
| 4,665,801 | 5/1987 | Budzich | 91/420 |
| 4,833,971 | 5/1989 | Kubik | 60/428 X |
| 4,845,948 | 9/1989 | Tha et al. | 60/427 |
| 5,007,544 | 4/1991 | Saotome et al. | 212/265 |

*Primary Examiner*—Edward K. Look
*Assistant Examiner*—Hoang Nguyen
*Attorney, Agent, or Firm*—J. W. Burrows

[57] ABSTRACT

An exhaust manifold (25) of a fluid power and control system, the pressure of which is varied when the fluid motor (10) is subjected to a bidirectional positive or negative type load (W). This exhaust manifold (25) is also supplied from a source of exhaust manifold pressurizing oil (29) other than the system pump (18). This source of exhaust manifold pressurizing oil (29) may include a flow amplifying device (57) which is activated when the fluid motor (10), in the form of a cylinder, moves a load in the direction of its piston rod end (11) and when the piston rod end (11) of cylinder (10) is subjected to a negative load pressure and when the pressure in the exhaust manifold (25) drops below a certain minimum preselected level. The flow amplifying device (57) is also activated when the cylinder (10) controls a negative type load and when the system pump (18) becomes isolated from the fluid motor (10), in order to conserve the fluid power, generated by the pump (18), for use in control of other system loads (22).

21 Claims, 5 Drawing Sheets

EXHAUST PRESSURIZING CIRCUIT INCLUDING FLOW AMPLIFICATION

TECHNICAL FIELD

This invention relates generally to exhaust manifolds of fluid power and control systems and to the methods of pressurization and supply of additional fluid flow to such exhaust manifolds in response to direction of displacement of the cylinder type fluid motors and to the type of loads being controlled by such motors.

BACKGROUND OF THE INVENTION

During the duty cycle of a machine the conditions at the outlet of a cylinder type fluid motor may vary widely and the very undesirable condition of cavitation may take place. As is well known to those skilled in the art, cavitation may adversely affect the life of the system components, especially the system pump, generate noise and introduce very undesirable characteristics when controlling a load. For example, when controlling a negative load, acting in the direction of the piston rod of the cylinder, the inlet flow to the cylinder has to be supplemented by flow, equivalent to the displacement of the piston rod. Such an inlet flow may have to be supplemented, when the velocity of the negative load creates an inlet flow requirement higher than the capacity of the system pump, or when the flow from the system pump is not available, which is the case either during so-called "negative load regeneration", or when the flow at negative load is not diverted to the exhaust manifold. A typical negative load regeneration system is shown in U.S. Pat. No. 4,267,860 which issued May 19, 1981 to Tadeusz Budzich.

The condition of negative load regeneration, in the embodiment described in this specification, takes place when the controlled load is of an aiding or negative load type and when the flow of fluid from the system pump is isolated from the fluid motor. The control of the position of the load is accomplished by using the potential energy of the load. Under these conditions the flow from the pump can be directed to perform useful work in the control of other resistive, or positive type loads of the system. Under these conditions additional flow can be supplied to the exhaust manifold either from an additional low pressure pump, which in a mobile type circuit may be undesirable, since it requires a separate power take-off, or from a fluid flow amplifying device, using energy derived either from the negative load, or from the system pump. Since under the above conditions some of the flow transfer may have to take place through the anticavitational controls of a mobile type valve, it is to a great advantage to supply the necessary make-up flow at a preselected pressure level, higher than atmospheric. Also by maintaining both ends of a cylinder above a certain minimum pressure level, by compressing the entrained air, which is always present in the circulating oil, the system stiffness is substantially increased, which in turn produces a number of very beneficial effects. It is also very desirable, when controlling a positive load in mobile type circuits, to completely unload the pressure of the exhaust manifold, not only in order to increase the system efficiency, but also to increase the level of the effective force, developed by the cylinder, especially when raising a load using the maximum output flow from the system pump.

DISCLOSURE OF THE INVENTION

In one aspect of the present invention a fluid power and control system is provided comprising a cylinder type fluid motor that is subjected to a positive and a negative type load pressure and is also provided with a piston end and a piston rod end. A direction control valve means is operably connected to the fluid motor. The direction control valve means has means responsive to first and second control signals. A system pump, reservoir means, and exhaust manifold means are interposed between the direction control valve means, the fluid motor and the reservoir means. Signal generating means is operable to generate the first and second control signals. The first control signal through said direction control valve means is operable to induce displacement of the fluid motor towards the piston rod end and the second control signal through the direction control valve means is operable to induce displacement of the fluid motor towards the piston end. A source of manifold pressurizing oil at relatively low pressure is functionally interconnected to the exhaust manifold means. First activating means of said source of manifold pressurizing oil has logic means responsive to the first control signal and to the negative load pressure and operable to interconnect said exhaust manifold means with the source of manifold pressurizing oil in response to the simultaneous presence of the first control signal and the negative load pressure.

It is therefore a principal object of this invention to pressurize the exhaust manifold of a cylinder that is controlling a bidirectional load in order to avoid cavitation and to increase system stiffness.

It is another object of this invention to fully unload the pressure of the exhaust manifold of a cylinder controlling a positive type load.

It is still another object of this invention to pressurize the exhaust system of a cylinder controlling a bidirectional load, by providing pressurized fluid from an external source, which may include a fluid flow amplifying device, when negative load is displaced in the direction of the piston rod of the cylinder.

It is still another object of this invention to use in the exhaust system of a cylinder a fluid flow amplifying device provided with a pump-motor unit of a positive displacement type.

It is another object of this invention to use in the exhaust system of a cylinder a fluid flow amplifying device of a jet pump type.

It is another object of this invention to use the energy derived from a negative type load to provide power for the fluid flow amplifying device.

It is still another object of this invention to use the energy derived from the system pump to provide power for the flow amplifying device.

It is still another object of this invention to isolate the pump flow from a fluid motor controlling a negative type load and to introduce into the exhaust manifold of the fluid motor additional flow in order to prevent cavitation and conserve the pump flow for performing other work.

Briefly, the foregoing and other additional objects of this invention are accomplished by selectively pressurizing, unloading and supplying additional fluid flow to the exhaust manifold of a cylinder type fluid motor in respect to the duty cycle of the machine, the type of load and direction of displacement of the cylinder.

BEST MODE FOR CARRYING OUT THE INVENTION

Figure 1:
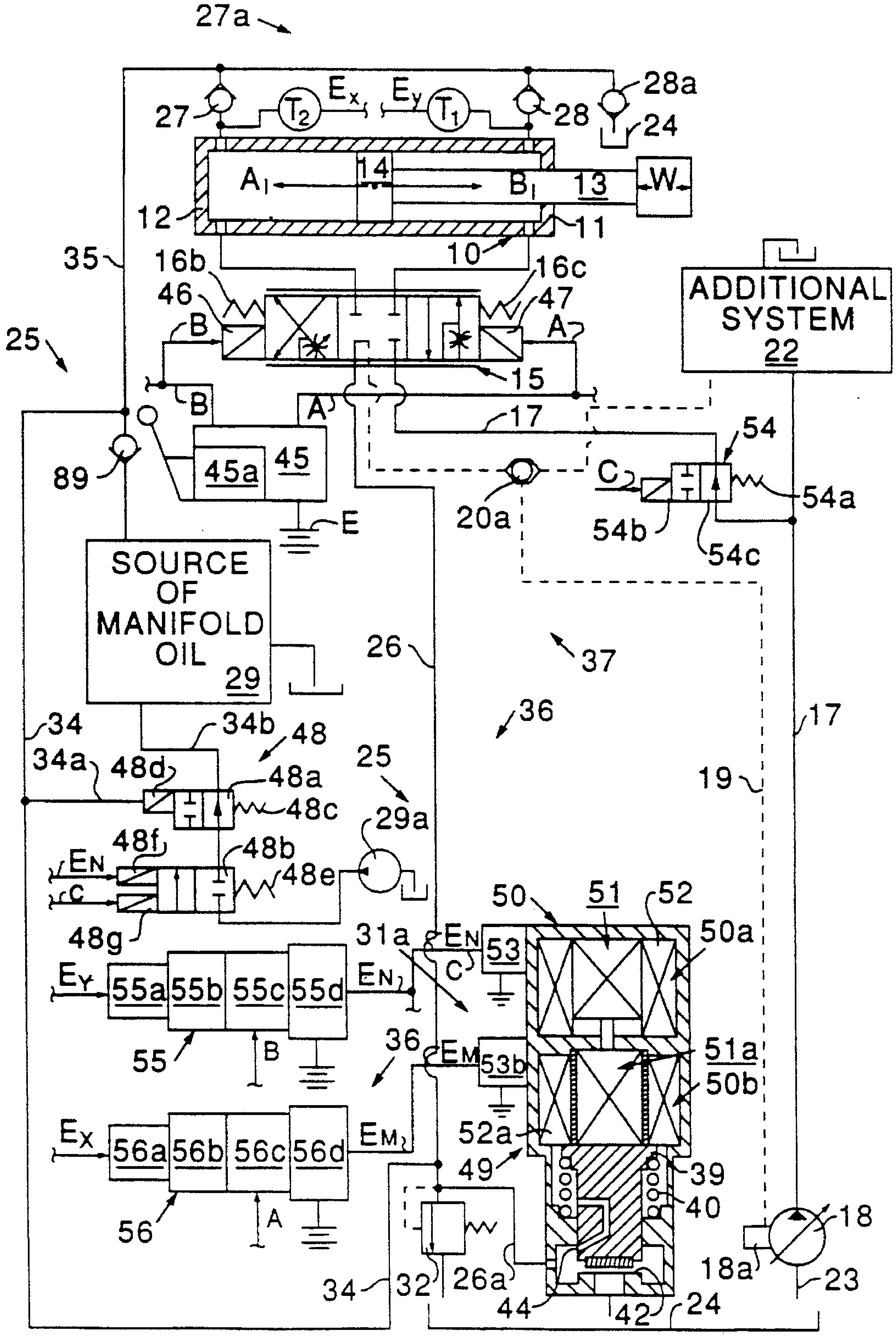
FIG. 1 is a schematic representation of a fluid power and control system provided with an exhaust manifold, which includes electrically operated pressurizing and flow inducing controls.

Referring now to FIG. 1, a fluid power and control system consists of a cylinder type fluid motor 10 provided with a piston rod end 11 and a piston end 12. A piston rod 13 of fluid motor 10 is attached to a piston 14 and a load W. The load W can be of a resistive-positive type or of an aiding-negative type and therefore can be subjected to positive load pressure from the pump and can generate a negative load pressure, due for example to the force of gravity. Direction control valve means 15, well known in the art, controls, through responsive means, such as, first and second solenoid devices 46 and 47, the direction of displacement of the load W in response to first and second control signals A and B. The first and second control signals A and B are supplied from signal generating means 45 having first means 45a operable to generate the first and second control signals A and B. As illustrated in FIG. 1, the first means 45a is of an electrical type. A source of fluid power energy designated as 29a provides fluid power energy for the hydraulic controls. In this embodiment the source of fluid power energy is in the form of a hydraulic pump. The direction control valve means 15 is of a spring center type using centering springs 16b,16c and is supplied through a discharge line 17 from a variable displacement system pump 18 connected by a suction line 23 to system reservoir means 24. The variable displacement system pump 18 has a load responsive type control 18a, well known in the art, which is provided through line 19 and logic shuttle valve 20a with the maximum positive load pressure signal, transmitted from fluid motor 10 and from diagrammatically shown valves of an additional system 22. Exhaust manifold means, generally designated as 25, is interposed between an outlet line 26, connected to the direction control valve 15 and anticavitational valve means 27a. The anticavitational check valve means 27a is made up of anticavitational check valves 27,28,28a, and are functionally connected to the fluid motor 10 and to the reservoir means 24. The exhaust manifold means 25 includes a source of exhaust manifold pressurizing oil 29 that is provided with first activating means, generally designated as 48, and manifold pressurizing means, generally designated as 31a. The manifold pressurizing means 31a, as illustrated, is composed of a pressurizing valve 32 and a solenoid operated cut-off valve 49. The solenoid operated cut-off valve 49 includes the cut-off piston 39, biased by the spring 40, in the direction away from the cut-off seat 42 and activated towards engagement with the cut-off seat 42 by a solenoid assembly, generally designated as 50. The solenoid assembly 50 consists of a first solenoid 50a and a second solenoid 50b. The first solenoid 50a consists of coil 52, armature 51 and junction box 53. The second solenoid 50b consists of coil 52a, armature 51a and junction box 53b.

Logic means, generally designated as 36 and of an electrical type, is provided and includes first electric logic element 55, second electric logic element 56 and pump control logic 37 which as illustrated is hydraulically operated. First and second actuating control signals $E_N$ and $E_M$, in the form of electrical signals, are generated by the first and second electric logic elements 55 and 56, which, in a manner as will be described in detail later in the text, control the sequence of operation of the source of manifold pressurizing oil 29 and of the solenoid operated cut-off valve 49. The first solenoid 50a responds either to the first electrical actuating control signal $E_N$, generated by the first electric logic element 55, or to an external electrical control signal C. The second solenoid 50b responds to the second electrical actuating signal $E_M$, generated by the second electric logic element 56.

The oil contained in the piston end 12 of the fluid motor 10 is connected to a first pressure transducer $T_2$, while the oil contained in piston rod end 11 of the fluid motor 10 is connected to a second pressure transducer $T_1$. The first and second pressure transducers $T_2$,$T_1$ are well known in the art and generate first and second output control signals $E_X$,$E_Y$ which, as illustrated, are electrical and are proportional to the pressure contained in the ends of the fluid motor 10. These electrical output control signals $E_X$,$E_Y$ are transmitted to the respective electrical logic elements 55 and 56. It is recognized that a hydraulic pressure signal could be directly used without departing from the essence of the invention if the controls of FIG. 1 were hydraulically actuated.

The first electric logic element 55 contains first means, such as, first resistance means 55a, first amplifying means 55b, second means, such as, first switching means 55c and second amplifying means 55d. The first electric logic element 55 generates the first electrical actuating control signal $E_N$ in response to the second control signal B and the second output control signal $E_Y$. The second electric logic element 56 contains third means, such as, second resistance means 56a, third amplifying means 56b, fourth means, such as, second switching means 56c and fourth amplifying means 56d. The second electric logic element 56 generates the second actuating control signal $E_M$ in response to the first control signal A and the first output control signal $E_X$.

Fluid cut-off means 54 is shown in the form of a solenoid operated on-off valve 54c biased by a spring 54a toward an open position and is provided with a solenoid 54b. The on-off valve 54c is of a normally open type and is made responsive to an external control signal C which is generated by the operator or in response to a predetermined function of the duty cycle of the machine and can be in many different forms well known in the art. The fluid cut-off means 54 is interposed in the discharge line 17 between the variable displacement pump 18 and the directional control valve 15.

The junction box 53 of solenoid assembly 50 is made responsive to the first actuating control signal $E_N$ and is also made responsive to the external signal C. The junction box 53b is made responsive to the second actuating control signal $E_M$.

The first activating means 48 of the source of exhaust manifold pressurizing oil 29 and the solenoid operated cut-off valve 49 of the pressurizing means 31*a* are connected by lines 26, 34, 34*a*, and 35 with the anticavitational check valve means 27*a* and are responsive to the first and second actuating control signals $E_N$,$E_M$ which are generated by the diagrammatically shown first and second electric logic elements 55 and 56.

The first activating means 48 includes first on-off valve means 48*a* and second on-off valve means 48*b* positioned in a line 34*b* leading from the source of fluid power energy 29*a* to the source of exhaust manifold pressurizing oil 29. The first on-off valve means 48*a* is biased by a spring 48*c* towards its open position against a force developed by a fluid actuator 48*d* that is subjected through the line 34*a* to the pressure in line 34 and therefore to the exhaust manifold pressure. The first on-off valve means 48*a* moves into an off position once a certain predetermined pressure level is achieved in the exhaust manifold means 25.

The second on-off valve means 48*b* is biased towards an off position by a spring 48*e* and moved into an on position either by solenoid 48*f*, in response to the first electrical actuating control signal $E_N$, or by solenoid 48*g* in response to the external control signal C generated during the duty cycle of the machine. With the first and second on-off valve means 48*a* and 48*b* in an on position; fluid energy from the source 29*a* is transmitted through line 34*b* to the source of exhaust manifold pressurizing oil 29 and subsequently through the check valve 89 to the line 35 as will be fully explained hereafter.

Figure 2:
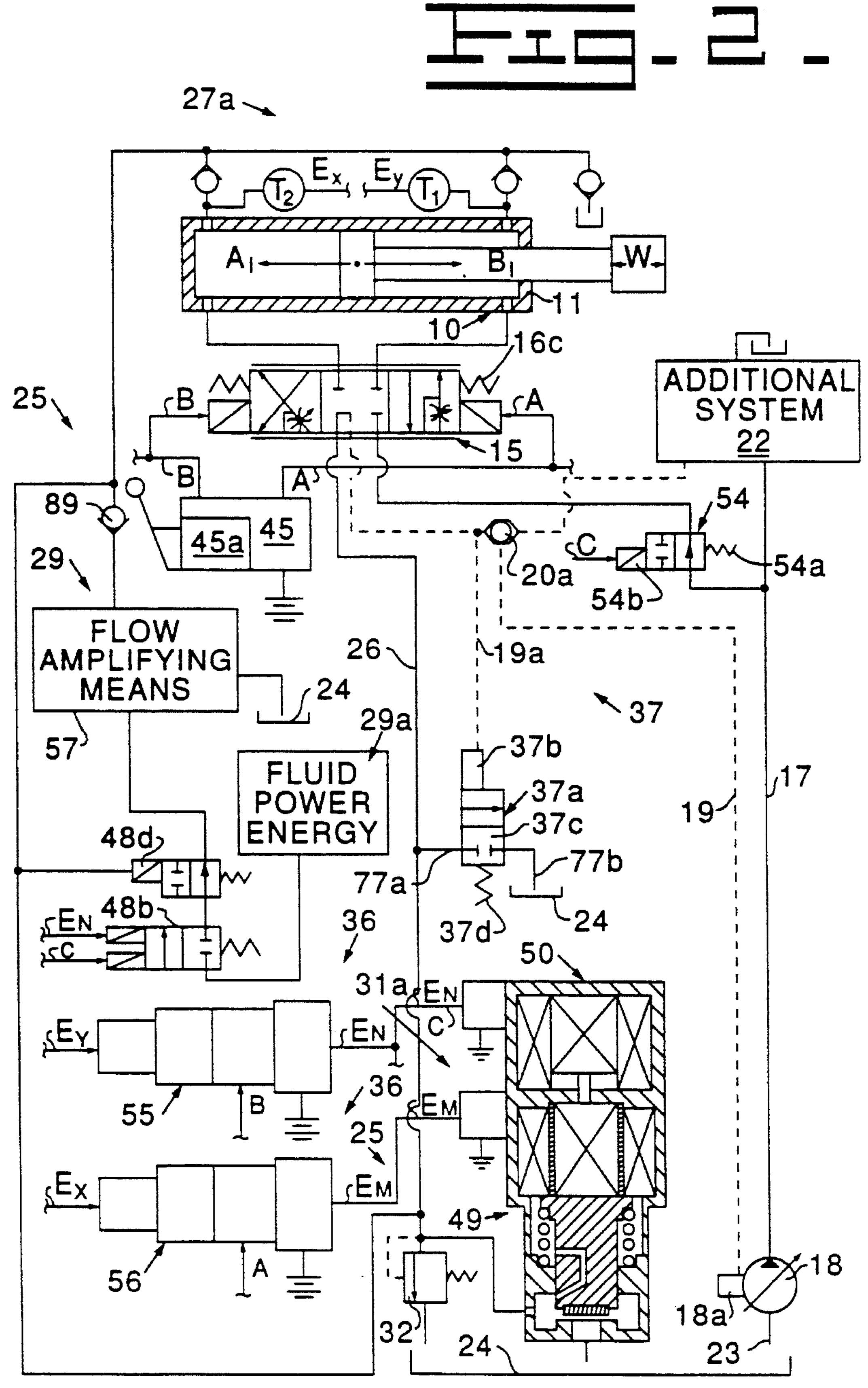
FIG. 2 shows the control arrangement of FIG. 1 provided with flow inducing controls applied to a flow amplifying device during control of negative load and negative load regeneration.

Referring now to FIG. 2, the fluid power and control system of FIG. 2 is very similar to that of FIG. 1, like components being designated by like numerals. However, in FIG. 2 the source 29 of exhaust manifold pressurizing oil of FIG. 1 is a flow amplifying means 57. The flow amplifying means 57 is provided with fluid power from the source of fluid power energy 29*a*. The source of fluid power energy 29*a* may derive its energy from many different sources, such as, the system pump, the engine or the battery.

During control of a positive load, in a well known manner, the positive load pressure is transmitted by line 19*a* to exhaust manifold depressurizing means 37*a* which includes actuating means 37*b* and a normally closed 2-way on-off valve 37*c*, which is biased towards the closed position by spring 37*d*. The 2-way on-off valve 37*c* is also connected by a line 77*a* with the outlet line 26 and a bypass line 77*b* to the system reservoir means 24.

Figure 3:
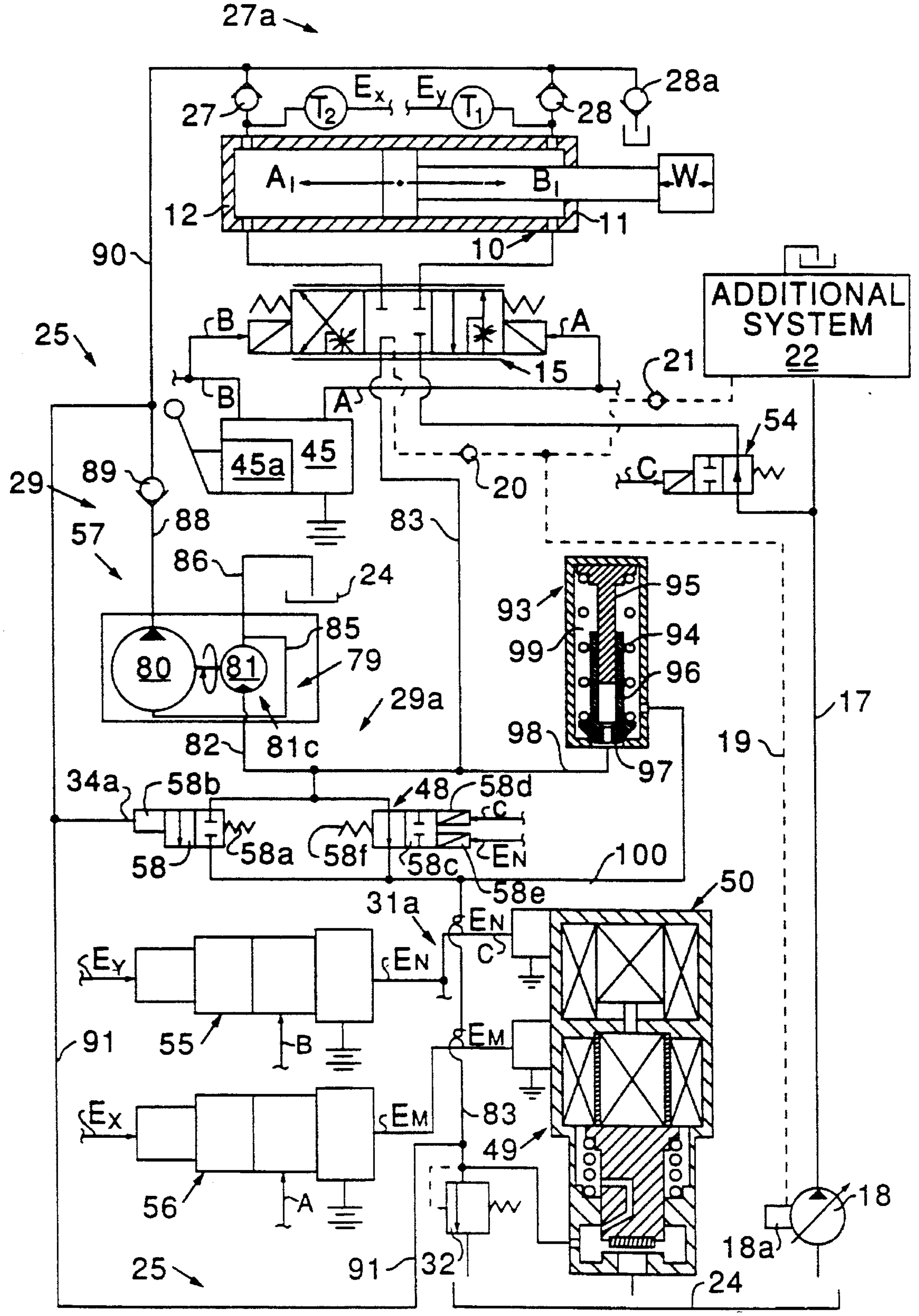
FIG. 3 shows a schematic representation of a fluid power and control system provided with an exhaust manifold similar to that of FIG. 1, but provided with a diagrammatically shown negative load pressure diverting control supplying energy to a diagrammatically shown flow amplifier.

Referring now to FIG. 3, the fluid power and control system of FIG. 3 is similar to that of FIG. 1, like components being designated by like numerals. The control system of the direction control valve 15 includes the electric logic elements 55 and 56 identical to the electric logic elements of FIG. 1, which provide the first and second actuating control signals $E_N$ and $E_M$, while being subjected to direction control signals A and B of electrical signal generator 45, identical to the signal generator of FIG. 1. The manifold pressurizing means 31*a* of FIG. 3 is composed of pressurizing valve 32 and solenoid operated cut-off valve 49, which is identical to the solenoid operated cut-off valve of FIG. 1. Diagrammatically shown variable displacement pump 18 is shown provided with load responsive control 18*a* connected through line 19 with the pump control logic system which includes logic check valves 20 and 21. In the system of FIG. 3, the source of exhaust manifold pressurizing oil 29 is a flow amplifying device 79, equivalent to the flow amplifying means 57 of FIG. 2, and is composed of a fixed displacement fluid pump 80 mechanically driven by a fixed displacement fluid motor 81. The source of fluid power energy 29*a* which drives the fixed displacement fluid motor 81 constitutes a power means 81*c* which is supplied through line 82 with fluid flow at negative load pressure transmitted through outlet line 83 and performs the same function as outlet line 26 of FIGS. 1 and 2. The outlet of the fluid motor 81 or first power means 81*c* and inlet of the fluid pump 80 are connected by lines 85 and 86 to system reservoir means 24. The outlet of the fluid pump 80 is connected through line 88 and the check valve 89 to the exhaust manifold means 25 which is connected through line 90 to the anticavitational check valve means 27*a*.

A negative load pressure limiting valve, generally designated as 93, is provided and may be of a single stage, pressure balance type, well known in the art. The negative load pressure limiting valve 93 is provided with a pressure limiting spring 94, a balancing plunger 95 and a balanced poppet 96 cooperating with a throttling seat 97. The inlet of the negative load pressure limiting valve 93 is connected by the line 98 to the line 82, which in turn is connected to the inlet port of the fluid motor 81 and the outlet line 83. Space 99 in the negative load pressure limiting valve 93 which is subjected to throttled down negative load pressure, is connected by line 100 and outlet line 83 to the inlet of the pressurizing valve 32 and lines 90,91 leading to the anticavitational check valve means 27*a*.

The first activating means 48 of FIG. 3 is positioned in the outlet line 83 upstream of the pressurizing valve 32 and the cut-off valve 49. The activating means 48 of FIG. 3 includes a third on-off valve means 58 biased by spring 58*a* towards its off position and moved into a flow transmitting position by a fluid actuator 58*b*, connected by the line 34*a* to the pressure in line 91 of exhaust manifold means 25. A fourth on-off valve means 58*c* is placed in parallel with the third on-off valve means 58 and is biased by spring 58*f* towards the open-flow conducting position. The fourth on-off valve means 58*c* is provided with solenoids 58*d* and 58*e*. The solenoid 58*d* in response to an external control signal C and/or the solenoid 58*e* in response to the first actuating control signal $E_N$ moves the fourth on-off valve means 58*c* to its off position, thus interrupting the flow of oil.

Figure 4:
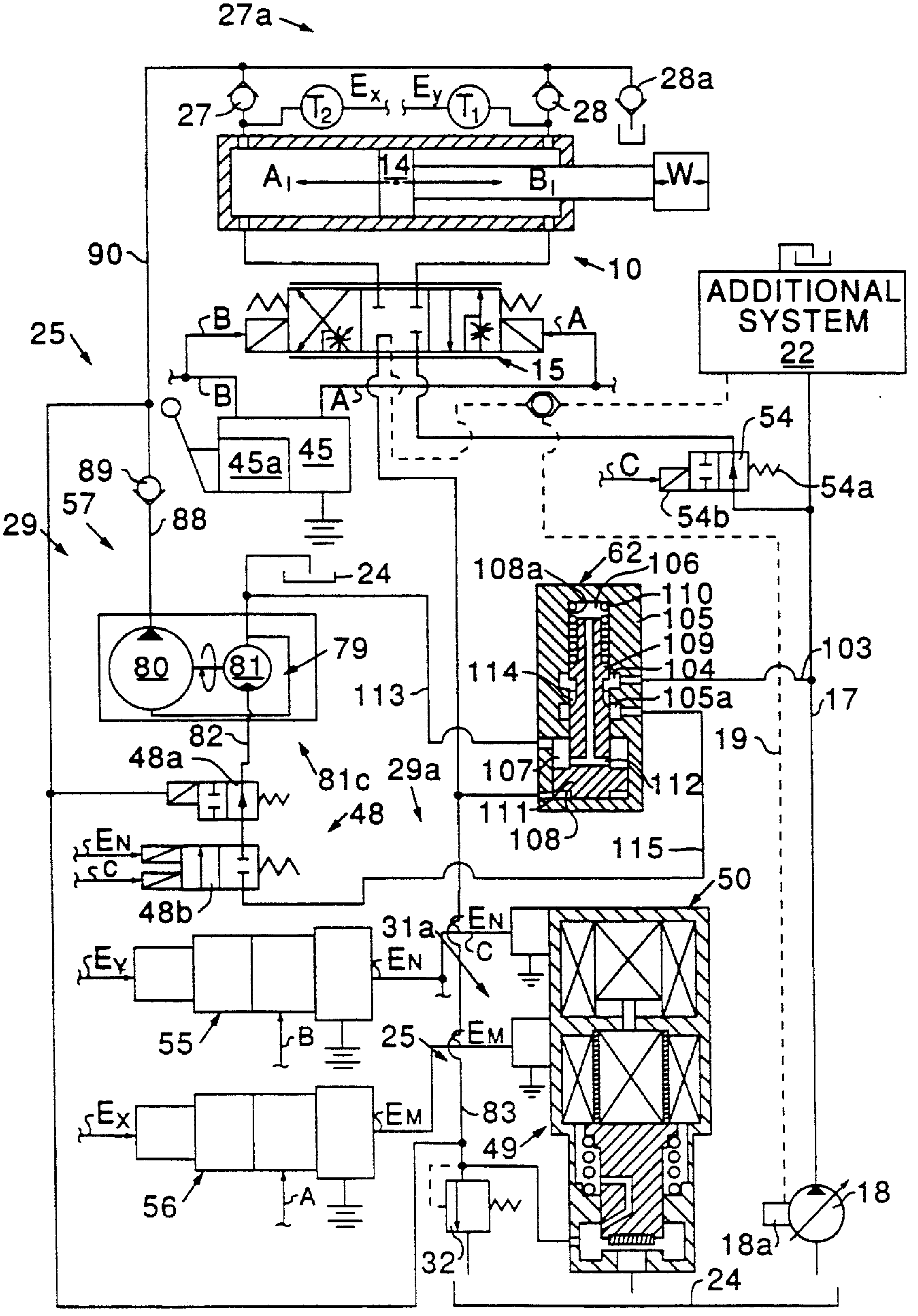
FIG. 4 shows a control arrangement similar to that of FIG. 3, but with a diagrammatically shown flow amplifier supplied with energy from the system pump through a pressure reducing control.

Referring now to FIG. 4, the fluid power and control system of FIG. 4 is very similar to that of FIG. 3. Diagrammatically shown fluid flow amplifying device 79 is identical to the flow amplifying device 79 of FIG. 3, which was earlier described in detail. The systems of FIG. 3 and FIG. 4 use identical electrical manifold pressurizing means 31*a* which includes the pressurizing valve 32 and the solenoid operated cut-off valve 49. The source of fluid power energy 29*a* needed to supply the power means 81*c* and drive the flow amplifying device 79 of FIG. 4 is derived from the system pump 18.

A constant pressure reducing valve, generally designated as 62, is provided and is shown in section. The constant pressure reducing valve 62 is supplied with fluid power from the variable displacement pump 18 through the discharge line 17 and feed line 103 to annular space 104 in a housing 105. The annular space 104 is operationally connected with an annular space 105*a*, a control space 106, an exhaust space 107 and a control space 108 by the bore 108*a* having a valve spool 109 slideably disposed therein. The valve spool 109 is biased by a spring 110 and provided with a piston 111. The exhaust space 107 is connected by a passage 112 with the control space 106, while also being connected by a line 113 with the system reservoir means 24. The spool 109 is provided with throttling ports 114 which are interposed between the annular spaces 104 and 105a. The space 105a is connected by a line 115, the activating means 48 and the line 82 with the inlet port of the fluid motor 81. The outlet port of the pump 80 is connected by the line 88, the check valve 89 and the line 90 with the anticavitational check valve means 27a. Electric logic elements 55 and 56, identical to those of FIG. 1, are provided to generate the first and second actuating control signals $E_N$ and $E_M$ which are directed to the activating means 48 and to the solenoid operated cut-off valve 49.

Figure 5:
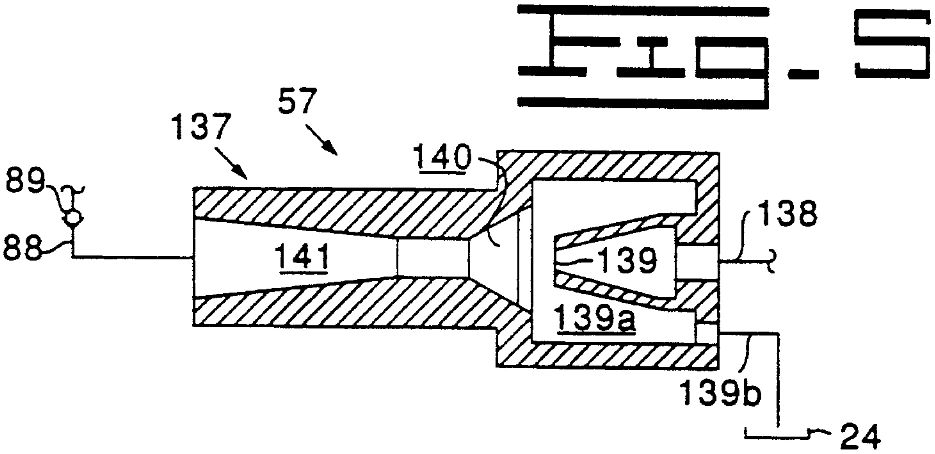
FIG. 5 shows a cross-sectional view of a jet pump type fluid flow amplifier, which can be used in the fluid power and control systems of FIGS. 3 and 4.

Referring now to FIG. 5, a jet pump means, generally designated as 137 and well known in the art, is shown in section. The jet pump means 137 can readily be substituted for the fluid flow amplifying means 57 of FIG. 2. The jet pump means 137 can also replace the flow amplifying device 79 of FIG. 4 as follows. The annular space 105a of the pressure reducing valve 62 of FIG. 4 is connected by line 138 to a jet nozzle 139 of the jet pump means 137. A throat 140 is located in front of the jet nozzle 139 and connects with a diverging section 141 connected by the line 88 through the check valve 89 to the exhaust manifold means 25, which in turn is connected by line 90 to the anticavitational check valve means 27a. The jet nozzle 139 is surrounded by a space 139a which is connected by a duct means 139b to oil at atmospheric pressure in the reservoir means 24.

Figure 6:
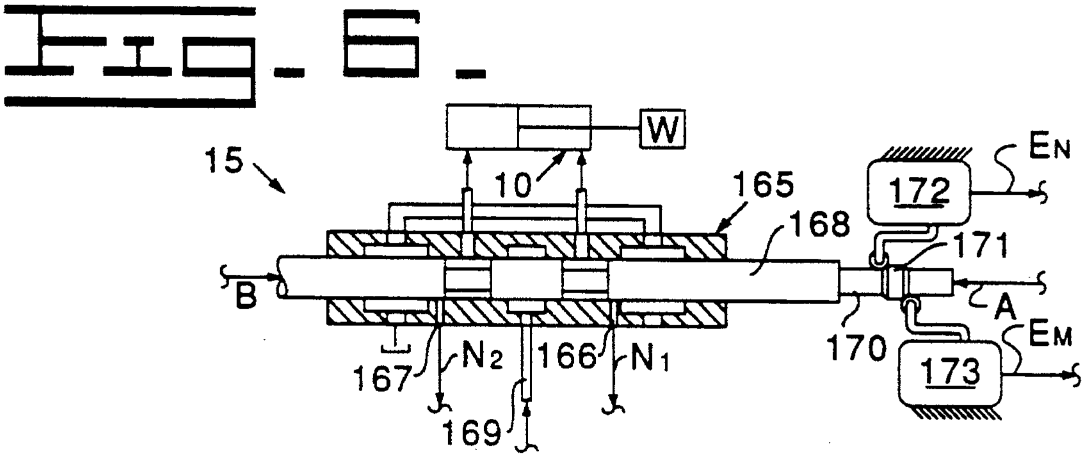
FIG. 6 shows a sectional view of a direction control valve provided with a different type of logic in determination of the presence of negative load pressures, generating electrical signals for use in the system of FIGS. 1, 2, 3 and 4.

Referring now to FIG. 6, the directional control valve 15 is in the form of a four-way direction control valve means 165 of the spool type and is provided with negative load pressure sensing ports 166 and 167, which, in a well know manner, through the sequencing action of a spool means 168 generate negative load pressure signals or logic pressure signals $N_1$ and $N_2$. Line 169 is connectable to the system pump 18. Spool means 168 which is subjected to the first and second control signals A and B is provided with an extension 170 and cam 171 which, depending on the direction of the control signal A or B, in a well known manner, actuate the micro-switches 172 and 173, well known in the art, in turn generating actuating control signal $E_N$ or $E_M$.

Figure 7:
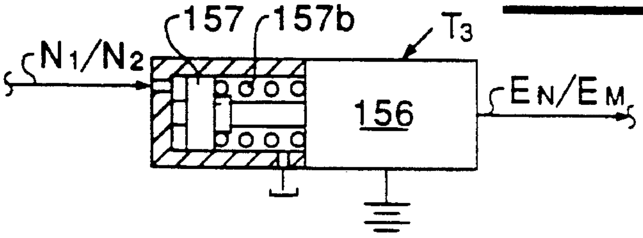
FIG. 7 shows in part section a control translating hydraulic load pressure signal into an electrical control signal.

Referring now to FIG. 7, a pressure switch $T_3$ is diagrammatically shown and includes an electric switch 156, well known in the art. The electric switch 156 is actuated from an off to an on position to produce one of the first and second actuating control signals $E_N$,$E_M$ by movement of a piston 157 which is responsive to the logic pressure signal $N_1$ or $N_2$ which is representative of the control pressure either in the rod end 11 or the piston end 12 of the fluid motor 10. The piston 157 is biased by spring 157b towards the off position. The spring 157b determines the minimum pressure level, at which the actuating signals $E_N$ and $E_M$ are generated and is equivalent to the first and second resistance means 55a,56a of the first and second electric logic elements 55,56.

Figure 8:
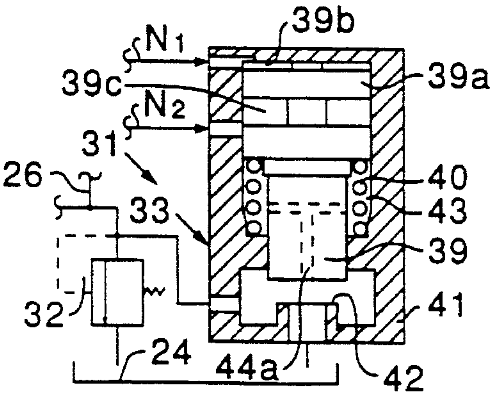
FIG. 8 shows in part section a hydraulically operated cut-off valve, performing the same function as the electrically operated cut-off valve of FIGS. 1 to 4.

Referring now to FIG. 8, hydraulic manifold pressurizing means 31 is identical in function to the manifold pressurizing means 31a of FIGS. 1–4 which were electrically actuated. The hydraulic pressure manifold means 31 includes the pressurizing valve 32 and a cut-off valve 33 with the cut-off piston 39 biased by the spring 40 and is guided in a housing 41. The cut-off piston 39, as in FIGS. 1–4 is operative to engage the cut-off seat 42. A space 43, containing the spring 40, is connected by a passage 44a with the reservoir means 24. An actuating piston 39a is in operational contact with the cut-off piston 39 and communicates with control spaces 39b and 39c. Control space 39b is subjected to the presence of negative load pressure of the logic pressure signal $N_1$, while control space 39c is subjected to negative load pressure of the logic pressure signal $N_2$. Logic pressure signals $N_1$ and $N_2$ are generated in response to actuation of the directional control valve 165 which was described above with reference to FIG. 6 and can only occur one at a time.

Industrial Applicability

Referring now back to FIG. 1, as is known to those skilled in the art, when controlling a negative or aiding type load by throttling negative load pressure from the piston rod end 11 additional fluid flow, equal to full displacement of the piston 14, must be supplied through the direction control valve 15 usually from the pump 18 to the piston end 12 of the cylinder 10. Under these conditions, when the velocity of the load W and the equivalent flow, due to displacement of the piston 14, exceeds the capacity of the pump 18, the space within the piston end 12 becomes subjected to negative pressure producing the well known, undesirable condition of cavitation, which not only affects the control characteristics of a bidirectional load, but also reduces the life expectancy of the equipment. Also, when controlling such a negative load the flow from the pump at a relatively low pressure is supplied to the fluid cylinder, reducing the capability of the pump to perform useful work in the other fluid motors of the hydraulic system.

Through the use of a pressurized hydraulic manifold 25 the throttled down flow from the level of the negative load pressure can be delivered to such a pressurized hydraulic manifold and supplied through the anticavitational check valve 27 to the piston end 12 of the cylinder 10, thus reducing the required flow input from the system pump 18 by the amount of fluid flow displaced from the piston rod end 11 of the fluid cylinder 10. This approach may save up to 50% of the flow required from the system pump during control of the negative load and therefore is very beneficial. However, at much higher velocities, the condition of cavitation within the cylinder 10 will still take place when controlling the negative load W.

When controlling a negative load acting towards the piston end 12 of the fluid cylinder 10 in the direction of the arrow $A_1$, the flow of the throttled down fluid from the piston end greatly exceeds the inlet flow requirements of the piston rod end 11 of the cylinder 10. With a properly pressurized exhaust manifold 25, flow through the anticavitational check valve 28 either greatly reduces pump flow, or when using the principle of so-called "negative load regeneration", may completely eliminate use of the pump flow.

As shown in FIG. 1 the anticavitational check valves 27,28, connected for one way fluid flow to the cylinder 10, can be provided through the exhaust manifold 25 and line 26 not only with the throttled down outlet flow from the cylinder 10, but also can be provided with additional flow from the source of exhaust manifold pressurized oil 29 through line 35. Such a source of exhaust manifold pressurized oil may be activated, or deactivated, in response to the requirements of the duty cycle. As already discussed above, the pressurized oil from the source 29 of exhaust manifold pressurizing oil is only required when the piston rod 13 is displaced in the direction of the arrow $B_1$ and when the load W is of a negative type, subjecting piston rod end 11 of the cylinder 10 to negative load pressure. Therefore, in the fluid power and control system of FIG. 1 the source 29 of exhaust manifold pressurized oil is only activated under those conditions by first activating means 48 during displacement of negative load in the direction of the arrow $B_1$ in response to the electrical actuating control signal $E_N$. As noted above, the actuating control signal $E_N$ is generated by the first electric logic element 55, which is subjected to the electrical control signal B and an electrical output control signal $E_Y$ from the transducer $T_1$ connected to the rod end 11 of the cylinder 10.

Pressurization of the exhaust manifold means 25 is not only beneficial from the standpoint of maintaining both sides of the piston 14 at a higher than atmospheric pressure level, thus increasing the system stiffness, but is also useful to overcome the resistance of the anticavitational check valves 27 and 28. This pressurization of the exhaust manifold means 25 is especially desirable during control of negative load from either end of the cylinder 10 and therefore hydraulic manifold pressurizing means 31*a* is automatically activated, once the presence of negative load pressure is detected by the logic means 36.

The variable displacement pump 18, provided with a load responsive control 18*a*, supplies pressurized oil through discharge line 17 to the direction control valve 15, well known in the art. The direction control valve 15, operated by first and second solenoid type devices 46 and 47, in response to first and second electrical control signals B and A, generated by electric signal generating means 45 and biased, in a well known manner, towards the center position by springs 16*b* and 16*c* controls the direction of displacement of the cylinder 10. Also, in a well known manner, the maximum load pressure signal is transmitted through the shuttle valve 20*a* and line 19 to the load responsive control 18*a* of the variable displacement pump 18.

The electric signal generating means 45, provided with energy from an electrical source, generally designated as E, generates electric control signals B and A, which establish the direction of displacement of the load W. Each of these signals results in a specific response of exhaust manifold means 25, when the controlled load W is of a negative load type.

As fully explained, when referring to FIG. 1, the presence of $E_N$ or $E_M$ actuating control signal identifies the presence in the cylinder 10 of negative load pressure, which can provide the energy to control the position of load W, without using the energy from the variable displacement pump 18. In the presence of the actuating control signal $E_N$ or $E_M$, the source of exhaust manifold pressurizing oil 29 is activated by first activating means 48 when the pressure in the exhaust manifold means 25 drops below the level as determined by the pressurizing valve 32.

The fluid cut-off means 54, once actuated towards the off position by the external control signal C, permits the use of the energy from the negative load, in control of the load which not only saves flow output of the pump 18, but permits the use of pump flow, at high pressure levels, in control of additional positive or resistive type system loads 22, thus greatly extending the capacity of the variable displacement pump 18 to perform useful work. At the same time, through the controls of the exhaust manifold means 25, the inlet flow requirements of the cylinder 10 are fully satisfied, without creating the condition of cavitation. The exhaust manifold pressurizing means 31*a* is provided with electro-mechanical type devices in the form of solenoids responding to electrical actuating control signals $E_N$ and $E_M$. The presence of electrical actuating control signal $E_N$, C, or $E_M$, signifying that the controlled load W is of an aiding or negative load type, automatically, through the displacement of cut-off piston 39, activates the electrical manifold pressurizing means 31*a*.

The pressure in the piston rod end 11 of the cylinder 10 is sensed by the pressure transducer $T_1$ and generates the electrical output control signal $E_Y$ which is proportional to the pressure in the piston rod end 11. The pressure in the rod end 11 or the head end 12 may also be sensed by use of the pressure switch $T_3$ of FIG. 7. In a similar way, the pressure within the piston end 12 is transmitted to the pressure transducer $T_2$ which generates the electrical output control signal $E_X$ that is proportional to the pressure in the piston end 12. These electrical output control signals $E_Y$ and $E_X$ are transmitted to the electric logic elements 55 and 56 in order to determine whether the load W is positive or negative. From the logic element 55, which is also subjected to electrical control signals B, the electrical actuating control signal $E_N$ is transmitted to the first activating means 48, to activate the source of exhaust manifold pressurizing oil 29. Also from the electrical logic element 56, the electrical actuating control signal $E_M$ is transmitted to the second solenoid 50*b* of the solenoid operated cut-off valve 49.

The presence of negative load pressure either in the rod end 11 or piston end 12 of piston 10 is established by the first and second electric logic elements 55 and 56 in the following way. Generation of the first control signal B automatically signifies that the piston 14 must be displaced towards the rod end 11 of the cylinder 10, as shown by the arrow B1. Under these conditions the first electric logic element 55 determines the presence of load pressure in the piston rod end 11, as determined by the transducer $T_1$ and transmitted by the electrical output control signal $E_Y$, automatically determines that the controlled load is of an aiding or negative load type, resulting in generation of the actuating control signal $E_N$. In an identical way, the second electric logic element 56 can determine the presence of a negative load. The presence of a negative load at either end of the cylinder 10 can also be determined by the logic arrangement of FIG. 6, which provides $N_1$ and $N_2$ negative load pressure signals and also generates electrical actuating control signals $E_N$ and $E_M$, which are equivalent to the actuating control signals $E_N$ and $E_M$, generated by the first and second electric logic elements 55 and 56.

The electric logic element 55 is composed of electrical components, well known in the art, and the first resistance means 55*a* limits the minimum level of the output control signal $E_Y$, at which the actuating control signal $E_N$ can be generated. The output of resistance means 55*a* is amplified by first amplifying means 55*b* and delivered to first switching means 55*c*, which is in an off position and is activated by control signal B. Upon activation of the switching means 55*c*, which may be a microswitch, well known in the art, the electrical signal of the first electric logic element 55 is further amplified by the second amplifying means 55*d* and is delivered as the electrical actuating control signal $E_N$, possessing sufficient energy to actuate the first activating means 48 and the first solenoid 50*a* of the exhaust pressurizing means 31*a*.

The second electric logic 56 is composed of similar components as the first electric logic element 55, but is subjected to the electrical control signal $E_X$ and the control signal A to generate the electrical actuating control signal $E_M$ which has sufficient energy to activate the second solenoid 50*b* of the exhaust pressurizing means 31*a*.

In FIG. 1 the electrical output control signals $E_X$ and $E_Y$, which are proportional to the pressure in each end of the cylinder 10, are generated by pressure transducers $T_1$,$T_2$, well known in the art. In the application of the power system of FIG. 1, the pressure switch $T_3$, which is illustrated in FIG. 7, could be used. The spring 157*b* of this device being equivalent to the first and second resistance means 55a,56a of the first and second electric logic elements 55 and 56.

The source of exhaust manifold pressurizing oil 29 can only be activated during the presence of a negative load, which is being displaced by a cylinder type fluid motor in the direction of its piston rod end, while the exhaust manifold pressure drops by a predetermined amount below the pressure setting of the pressurizing valve 32. For the source of exhaust manifold pressurizing oil 29 to be activated, the above-noted two conditions must take place simultaneously, thus actuating the first and second on-off valves 48a and 48b towards their flow transmitting positions. The source of exhaust manifold pressurizing oil 29 may also be activated by the external control signal C which displaces the fluid cut-off means 54 towards the off position, thus isolating the fluid motor 10 from the system pump 18. With the fluid cut-off means in its flow isolating position, the specific drop in the exhaust manifold pressure moves the first on-off valve means 48a to its flow transmitting position, while the external control signal C also moves the second on-off valve means 48b to its flow transmitting position.

Referring now to FIG. 2, the source of manifold pressurizing oil of FIG. 1 in FIG. 2 is the form of flow amplifying means 57, which may take many forms and which may be supplied with fluid power energy from many sources containing relatively high pressure oil. The flow amplifying means 57, usually in the form of a flow amplifying device, receives a small amount of flow at a high pressure level and delivers, in this case to the exhaust manifold means 25, a large amount of flow at a relatively low pressure level while the total energy of the input flow and the output flow is approximately the same, that is, if disregarding the mechanical efficiency of the flow amplifying device itself. The selection of the type and of the the basic parameters of the flow amplifying device is influenced by the level of the exhaust pressurization, ratio of effective piston to piston rod areas of the fluid cylinder and the maximum make-up flow required during control of a negative type load with flow from the system pump 18 isolated from the fluid cylinder 10—condition of so-called "negative load regeneration". The energy for the fluid flow amplifying device 57 would be probably derived from negative load pressure, since this energy is usually converted to heat by the throttling process and therefore can not be used to perform useful work. The use of this type of fluid power energy presents an additional advantage, since it becomes available when fluid flow amplification is required by the exhaust manifold circuit 25.

The activating controls of the fluid flow amplifying means 57 of FIG. 2 are identical to those of FIG. 1 and works in an identical way. The use of the flow amplifying device is only needed when the pressure of the exhaust manifold means 25 drops below a certain predetermined level and when the controlled load W is of a negative type.

During control of positive loads, especially when raising a load using maximum pump flow, the resistance through the electrical manifold means 25 is greatly reduced. To reduce this resistance even further, the 2-way on-off valve 37c of the exhaust manifold depressurizing means 37a is used. The spring 37d maintains the on-off valve 37c in its closed position. With the presence of positive load pressure upstream of the logic shuttle valve 20a, the load pressure is transmitted through line 19a to the actuating means 37b. This automatically moves the 2-way on-off valve 37c to its flow conducting position directly connecting, through lines 77a and 77b, the outlet line 26 with reservoir means 24, thus further reducing the resistance to flow from the fluid cylinder 10 and increasing the load handling capacity of the fluid cylinder.

Referring now to FIG. 3, the fluid power and control system of FIG. 3 is similar to that of FIG. 2, the only difference between those two figures being that the 2-way on-off valve 37c of the exhaust manifold depressurizing means 37a is not included and schematically shown flow amplifying means 57 and the source of fluid power energy 29a are shown in greater detail. Flow amplifying means 57 of FIG. 3 is the flow amplifying device 79 which consists of the fixed displacement pump 80 mechanically driven by the fluid motor 81. The displacement of pump 80 is substantially greater than the displacement of motor 81. In this way an inlet flow to the motor 81 at a higher pressure, but lower flow level is delivered by pump 80 at a higher flow level, but lower pressure, thereby acting as a flow amplifying device. The discharge flow from pump 80 is delivered through line 88 and check valve 89 to the exhaust manifold means 25. To generate a relatively high pressure at the inlet of the fluid motor 81, the activating means 48, in response to the actuating control signal $E_N$ or C and to the drop of the pressure level in exhaust manifold means 25, cuts off the outlet flow from the direction control valve 15 through outlet line 83. Consequently, the pressure in the outlet line 83 and at the inlet to the fluid motor 81 is automatically raised to the level of the pressure setting of the negative load pressure limiting valve 93. The pressure setting of the pressure limiting valve 93 is determined by the biasing force of spring 94 and the ratio of the areas of the throttling seat 97 and the cross-sectional area of the balancing plunger 95. The throttled down higher pressure oil at throttling seat 97 is delivered to space 99, from where it is conducted through line 100 to the outlet line 83, downstream of the activating means 48 but upstream of the pressurizing valve 32. The flow amplifying device 79 takes the lower flow at the higher negative load pressure and delivers the higher flow to the exhaust manifold means 25 at a lower pressure level, as limited by the setting of the pressuring valve 32. Therefore, in this way the outlet volume flow from the direction control valve 15 is amplified and delivered to the exhaust manifold means 25. The inlet of the pump 80 and outlet of the motor 81, of the flow amplifying device 79, are connected by lines 85 and 86 to reservoir means 24. Therefore, flow amplification of the flow amplifying device 57 can only take place either during negative load regeneration or during displacement of load W in the direction of the arrow $B_1$ when the velocity of the negative load W exceeds the flow output capacity of the system pump 18.

Referring now to FIG. 4, the fluid power and control system of FIG. 4 is very similar to that of FIG. 3 and is based on the principle of FIG. 2. The flow amplifying device 79 of FIG. 4 is identical in basic construction and principle of operation as the flow amplifying device 79 of FIG. 3. In the arrangement of FIG. 4, higher pressure oil to the inlet of the motor 81 is delivered from the variable displacement pump 18 at a pressure level, as determined by the constant pressure reducing valve 62. The flow from the variable displacement pump 18 is delivered through lines 17 and 103 to the annular space 104, from which it is throttled down by the throttling action of throttling ports 114 to a lower pressure level and delivered to annular space 105a, which is connected through line 115, activating means 48 and line 82 to the inlet port of the fluid motor 81. The throttling action of the throttling ports 114 is determined by the preload of the spring 110 and controlled by the position of the valve spool 109 and the cross-sectional area of the piston 111. The cross-sectional area of the piston 111 is subjected on its differential area to the pressure in the control space 108, which is equal to the pressure setting of the pressurizing valve 32 since the exhaust pressurizing means 31*a* is in the blocking condition in response to the external control signal C. Therefore, as long as the pressure in the exhaust manifold does not exceed the pressure setting of the pressurizing valve 32, the constant pressure reducing valve 62 automatically diverts enough flow at a sufficiently high pressure level to maintain the amplifying flow through the amplifying device 79 to the exhaust manifold means 25 at a preselected pressure level below that of the pressure setting of the pressurizing valve 32. The presence of a negative type load with the piston 14 being displaced towards the rod end of the cylinder, or the absence of the pump flow established by presence of the external control signal C, automatically moves the second on-off valve means 48*b* into the fluid flow transmitting position. The drop in pressure in the exhaust manifold means 25, to a certain predetermined level, also automatically moves the first on-off valve means 48*a* into the fluid flow transmitting position. With the above two conditions occurring simultaneously, the flow amplifying device 79 is activated.

Referring now to FIG. 5, the fluid flow amplifying means 57 is in the form of the jet pump means 137 in which a lower flow at a higher pressure is converted into higher flow at a lower pressure. The jet nozzle 139 is connected through line 138 to a source of fluid power, such as the pump 18, see FIG. 4. In a well known manner, a jet of oil at high velocity is ejected from the nozzle 139 into the space 139*a* which is connected to reservoir means 24 and enters into the throat 140 carrying with it fluid flow from the space 139*a*. The kinetic energy of this now mixed jet of fluid is converted back into pressure and flows into the diverging section or diffuser 141, which is directly connected to the exhaust manifold means 25 through the line 88. Therefore, the flow amplifying device 79 of FIG. 4 can be substituted by the jet pump means 137 of FIG. 5. In systems in which the exhaust manifold means 25 must be maintained at a relatively high pressure, the jet pump means 137 of FIG. 5 is not very efficient as a flow amplifying device. Its performance is also degraded, when working with very high viscosity fluids at low operating temperatures.

Referring now to FIG. 6, the spool type direction control valve 165 is provided with negative load pressure sensing ports 166 and 167, which directly generate the first and second logic pressure signals $N_1$ and $N_2$ and therefore constitute a logic system, equivalent to the electric logic elements 55 and 56. When the spool means 168 is displaced from its neutral position by any type of force control signals A and B,the cam 171 actuates one of the micro-switches 172,173 to generate the respective first and second electrical actuating control signals $E_N$,$E_M$. The arrangement of FIG. 6 is unusual in this respect that it not only automatically identifies the negative load pressure signals from opposite ends of the cylinder as $N_1$ and $N_2$, but also identifies, through generation of the first and second actuating control signals $E_N$ and $E_M$, the direction of displacement of spool means 168 from its neutral position. In this arrangement, the first and second control signals A and B do not have to be remotely generated and spool means 168 can be directly manually operated.

Referring now to FIG. 7, the pressure switch $T_3$ is composed of an electric micro-switch 156, well known in the art, maintained in a normally off position, which is mechanically actuated by the force, developed on the cross-sectional area of piston 157 by one of the logic pressure signals $N_1$, $N_2$ generated within the fluid motor 10, as illustrated in FIG. 6, against the biasing force of spring 157*b*. At a pressure level, at which the product of the cross-sectional area of piston 157 and the logic pressure signal $N_1$ or $N_2$ exceeds the biasing force of the spring 157*b*, the piston 157 will move to the right, actuating the micro-switch 156 and generating respective electrical actuating control signals $E_N$,$E_M$. Schematically shown electric switch 156 may also include an amplifying device, depending on the energy level, at which electrical actuating control signal $E_N$ or $E_M$ must be generated. The use of the device of FIG. 7 was described, when referring to FIG. 1. This type of device can be very useful, since most of the components of FIG. 1 do not require proportional type signals and can be actuated by on/off type devices. Also, it was noted that the spring 157*b* of FIG. 7 can be equivalent to the first and second resistance means 55*a*,56*a* of the first and second electric logic elements 55,56.

Referring now to FIG. 8, the hydraulic pressurizing means 31 is the hydraulic equivalent of the electrically operated pressurizing means 31*a* of FIGS. 1–4 and performs the same function. As is well know to those skilled in the art, in most instances an electrically controlled hydraulic system can be adapted to the use of hydraulic controls, responsive to hydraulic control pressure signals. Consequently, the solenoids of electrical systems are replaced with well known fluid actuators. In this arrangement, logic pressure signals $N_1$,$N_2$, as generated by the directional valve means 165 of FIG. 6, act in the respective fluid chambers 39*b*,39*c* to move the cut-off piston 39 to a flow blocking position.

The basic objects of this invention are best utilized in a fluid power and control system using fluid motors of a cylinder type in control of large positive and negative type loads. By supplementing the inlet flow requirements of the cylinder type fluid motors not only savings in fluid flow supplied from the system pump during control of negative load are obtained, the velocity of the negative load, well in excess of the total flow capability of the system pump is obtained while avoiding cavitation. The system stiffness and quality of the control of a load, or tool is greatly improved, while also providing the possibility of obtaining additional inlet flow to the cylinder from the fluid flow amplifying devices, which do not require an additional hook-up to the mechanical drive. Fluid power and control systems, provided with the above features, are especially useful in mobile type vehicles, using hydraulically operated tools which are subjected to high positive and negative loads and are provided with a plurality of work elements, such as in the case of hydraulically powered excavators.

Other objects and advantages of this invention can be obtained from a study of the drawings, the disclosure and the appended claims.

I claim:

1. In a fluid power and control system comprising a cylinder type fluid motor (10) subjected to a positive and a negative type load pressure and provided with a piston end (12) and a piston rod end (11), direction control valve means (15) operably connected to said fluid motor (10), said direction control valve means (15) having means (46,47) responsive to a first (B) and a second (A) control signal, a system pump (18), reservoir means (24), and exhaust manifold means (25) interposed between said direction control valve means (15), said fluid motor (10) and said reservoir means (24), signal generating means (45) operable to generate said first (B) and second (A) control signals, said first control signal (B) through said direction control valve means (15) operable to induce displacement of said fluid motor (10) towards said piston rod end (11) and said second control signal (A) through said direction control valve means (15)

operable to induce displacement of said fluid motor (10) towards said piston end (12), a source of manifold pressurizing oil (29) at relatively low pressure functionally interconnected to said exhaust manifold means (25), and first activating means (48) of said source of manifold pressurizing oil (29) having logic means (36) responsive to said first control signal (B) and to said negative load pressure ($E_N$, $E_M$, $N_1$, $N_2$) and operable to interconnect said exhaust manifold means (25) with said source of manifold pressurizing oil (29) in response to simultaneous presence of said first control signal (B) and said negative load pressure ($E_N$, $E_M$, $N_1$, $N_2$).

2. A fluid power and control system as set forth in claim 1 wherein anticavitational check valve means (*27a*) is interposed between said fluid motor and said exhaust manifold means (25).

3. A fluid power and control system as set forth in claim 1 wherein said exhaust manifold means (25) has pressurizing means (31*a*), activating means (39) of said pressurizing means (31*a*) responsive to said negative load pressure ($E_N$, $E_M$, $N_1$, $N_2$) operable to activate said pressurizing means (31*a*) in presence of said negative load pressure and to unload said pressurizing means (31*a*) in absence of said negative load pressure.

4. A fluid power and control system as set forth in claim 1 wherein said source of manifold pressurizing oil (29) has fluid flow amplifying means (57) including a fluid flow amplifying device (79) operable to supply fluid flow from said reservoir means (24) to said exhaust manifold means (25), power means (81*c*) in said fluid flow amplifying device (79), and a source of fluid power energy (29*a*) operable to provide energy to said power means (81*c*).

5. A fluid power and control system as set forth in claim 1 wherein said source of manifold pressurizing oil (29) has fluid flow amplifying means (57) including a fluid flow amplifying device (79) operable to supply fluid flow from said reservoir means (24) to said exhaust manifold means (25), and power means (81*c*) in said fluid flow amplifying device (79) provided with energy from said negative load.

6. A fluid power and control system as set forth in claim 1 wherein said source of manifold pressurizing oil (29) has fluid flow amplifying means (57) including a fluid flow amplifying device (79) operable to supply fluid flow from said reservoir means (24) to said exhaust manifold means (25) and power means (81*c*) in said fluid flow amplifying device (79) provided with energy from said system pump (18).

7. A fluid power and control system as set forth in claim 1 wherein said source of manifold pressurizing oil (29) has fluid flow amplifying means (57) including a fluid flow amplifying device (79) provided with a positive displacement pump (80) and motor means (81).

8. A fluid power and control system as set forth in claim 1 wherein said source of manifold pressurizing oil (29) has fluid flow amplifying means (57) including a fluid flow amplifying device (79) provided with jet pump means (137).

9. A fluid power and control system as set forth in claim 1 wherein fluid cut-off means (54) is interposed between said system pump (18) and said fluid motor (10) and activating means (54*b*) of said cut-off means (54) responsive to an external control signal (C) and operable to interrupt fluid flow from said pump (18) to said motor (10) when said fluid motor is subjected to said negative load pressure ($E_N$, $E_M$, $N_1$, $N_2$).

10. A fluid power and control system as set forth in claim 9 wherein said activating means (48) of said source of manifold pressurizing oil (29) has on-off means (48*b*) having means (48*g*) responsive to said external control signal (C) operable to interconnect said source of manifold pressurizing oil (29) and said exhaust manifold means (25) in presence of said external control signal (C).

11. A fluid power and control system as set forth in claim 1 wherein said signal generating means (45) has first means (45*a*) operable to generate said first (B) control signal and said second control signal (A) of an electrical type.

12. A fluid power and control system as set forth in claim 1 wherein said signal generating means (45) has first means (45*a*) operable to generate said first (B) and said second (A) control signal of a fluid power type.

13. A fluid power and control system as set forth in claim 1 wherein said direction control valve means (15) is a directional control valve (165) having direction control spool means (168).

14. A fluid power and control system as set forth in claim 1 wherein fluid in said piston end (12) is connected to a first pressure transducer means ($T_2$) operable to generate a first electrical output control signal ($E_X$) in response to fluid pressure in said piston end (12) and fluid in said piston rod end (11) is connected to second pressure transducer means ($T_1$) operable to generate a second electrical output control signal ($E_Y$) in response to fluid pressure in said piston rod end (11).

15. A fluid power and control system as set forth in claim 1 wherein said logic means (36) includes a first electric logic element (55) having first means (55*a*) responsive to pressure in said piston rod end of said fluid motor (10) and second means (55c) responsive to said first control signal (B), said logic means (36) operable to generate a first actuating control signal ($E_N$) to said first activating means (48).

16. A fluid power and control system as set forth in claim 1 wherein said logic means (36) includes a second electric logic element (56) having third means (56*a*) responsive to pressure in said piston end (12) of said fluid motor (10) and fourth means (56*c*) responsive to said second control signal (A) said logic means (36) operable to generate a second actuating control signal ($E_M$).

17. A fluid power and control system as set forth in claim 16 wherein said second actuating control signal ($E_M$) is directed to said pressurizing means (31*a*).

18. A fluid power and control system as set forth in claim 1 wherein said first activating means (48) has on-off means (48*a*) responsive to pressure in said exhaust manifold means (25) and operable to prevent fluid flow from said source of oil (29) to said exhaust manifold means (25) when the pressure in said exhaust manifold means (25) is above a certain predetermined pressure level.

19. A fluid power and control system as set forth in claim 1 wherein said logic means (36) includes means (20*a*) operable to identify the presence of positive load pressure in said fluid motor (10) and to generate a positive load pressure signal and exhaust manifold depressurizing means (37*a*) having actuating means (37*b*) responsive to said positive load pressure signal, said depressurizing means (37*a*) operable to interconnect said exhaust manifold means (25) with said reservoir means when said fluid motor (10) is subjected to said positive load pressure.

20. A fluid power and control system as set forth in claim 1 wherein said logic means (36) includes a first electric logic element (55) having first switching means (55*c*) operable to receive said first control signal (B) and first amplifying means (55*b*) operable to receive an electrical output signal ($E_Y$) generated by a pressure transducer ($T_1$) connected to fluid in said piston rod end (11), said first electric logic element (55) operable to generate an activating first actuating control signal ($E_N$) to said first activating means (48) of said source of manifold pressurizing oil (29) once the voltage of said first electrical output signal ($E_Y$) exceeds a certain minimum level as determined by first resistance means (55*a*).

21. A fluid power and control system as set forth in claim 18 wherein second electric logic element (56) has second switching means (56*c*) operable to receive said second control signal and third amplifying means (56*b*) operable to receive an electrical output signal (EX) generated by a pressure transducer ($T_2$) connected to fluid in said piston end (12), said second logic element (56) operable to generate a second actuating control signal ($E_M$) to said solenoid operated cut-off valve (49) once the voltage of said first electrical output signal ($E_X$) exceeds a certain minimum level as determined by second resistance means (56*a*).

* * * * *